(12) United States Patent
Palanichamy et al.

(10) Patent No.: US 11,675,982 B2
(45) Date of Patent: *Jun. 13, 2023

(54) SYSTEMS AND METHODS FOR NATURAL LANGUAGE PROCESSING IN GAMING ENVIRONMENTS

(71) Applicant: LNW Gaming, Inc., Las Vegas, NV (US)

(72) Inventors: Muthukumaran Palanichamy, St Albert (CA); Mahesh Sundaramurthy, Mississauga (CA)

(73) Assignee: LNW Gaming, Inc., Las Vegas, NV (US)

( * ) Notice: Subject to any disclaimer, the term of this patent is extended or adjusted under 35 U.S.C. 154(b) by 103 days.

This patent is subject to a terminal disclaimer.

(21) Appl. No.: 17/376,683

(22) Filed: Jul. 15, 2021

(65) Prior Publication Data

US 2021/0342550 A1 Nov. 4, 2021

Related U.S. Application Data

(63) Continuation of application No. 16/387,721, filed on Apr. 18, 2019, now Pat. No. 11,157,703.

(60) Provisional application No. 62/660,047, filed on Apr. 19, 2018.

(51) Int. Cl.
*G06F 40/30* (2020.01)
*G06F 40/284* (2020.01)
*G07F 17/32* (2006.01)

(52) U.S. Cl.
CPC ............ *G06F 40/30* (2020.01); *G06F 40/284* (2020.01); *G07F 17/3209* (2013.01); *G07F 17/3288* (2013.01)

(58) Field of Classification Search
CPC .... G06F 40/30; G06F 40/284; G07F 17/3209; G07F 17/3288
See application file for complete search history.

(56) References Cited

U.S. PATENT DOCUMENTS

| | | | |
|---|---|---|---|
| 7,496,746 B2 | 2/2009 | Rajput | |
| 10,424,297 B1 | 9/2019 | Carino | |
| 10,504,512 B1 | 12/2019 | Sarikaya et al. | |
| 11,157,703 B2 * | 10/2021 | Palanichamy | .......... G06F 40/30 |
| 2006/0040718 A1 | 2/2006 | Davis | |
| 2007/0150865 A1 | 6/2007 | Rajput | |

(Continued)

*Primary Examiner* — Fariba Sirjani (57) ABSTRACT

A natural language processing system includes logic circuitry that receives, from a first user channel, a user query including natural language (NL) input in a colloquial format from an end user, selects a first NLP application from a plurality of NLP applications, transforms, using the first NLP application, the NL input into a plurality of language tokens, extracts a command trigger from the language tokens, determines that the command trigger is linked to a command executable by a first wagering game channel, transmits a command query incorporating the command to the first wagering game channel, receives a command reply including wagering game data associated with the command from the first wagering game channel, generates, using the first NLP application, an NL response that includes the wagering game data and is structured in a colloquial format, and transmits the NL response to the end user via the first user channel.

20 Claims, 6 Drawing Sheets

(56) References Cited

U.S. PATENT DOCUMENTS

| | | |
|---|---|---|
| 2007/0250384 A1* | 10/2007 | Geller .................. G06Q 30/06 |
| | | 705/14.54 |
| 2007/0288404 A1 | 12/2007 | Kacmarcik |
| 2011/0314515 A1 | 12/2011 | Hernoud et al. |
| 2014/0114943 A1 | 4/2014 | Holenweger et al. |
| 2014/0358964 A1 | 12/2014 | Woods et al. |
| 2016/0301745 A1 | 10/2016 | Bigby et al. |
| 2017/0075884 A1 | 3/2017 | Sripada et al. |
| 2017/0337186 A1 | 11/2017 | Zhang et al. |
| 2018/0114127 A1 | 4/2018 | Cole et al. |
| 2018/0232203 A1 | 8/2018 | Gelfenbeyn et al. |
| 2018/0373494 A1 | 12/2018 | Loughrey et al. |
| 2019/0012876 A1 | 1/2019 | Brahmandam et al. |
| 2019/0311036 A1 | 10/2019 | Shanmugam et al. |
| 2021/0342550 A1* | 11/2021 | Palanichamy ...... G07F 17/3288 |

* cited by examiner

SYSTEMS AND METHODS FOR NATURAL LANGUAGE PROCESSING IN GAMING ENVIRONMENTS

CROSS-REFERENCE TO RELATED APPLICATIONS

This application is a continuation of U.S. patent application Ser. No. 16/387,721, filed on 18 Apr. 2019, which claims the benefit of U.S. Provisional Patent Application 62/660,047, filed on 19 Apr. 2018, both of which are hereby incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2018, Bally Gaming Inc.

FIELD OF THE INVENTION

The present invention relates generally to systems, apparatus, and methods and, more particularly, to integrated platforms for processing natural language messages associated with game data.

BACKGROUND OF THE INVENTION

In the gaming industry, various types of data associated with gaming environments (i.e., both physical and digital environments) are collected. The gaming data may include, but is not limited to, player tracking data, employee tracking data, device data from game machines, purchase data, and the like. This data is collected and stored for analysis and for historical recording. The various types of data from various gaming environments are stored by a respective server, database, or other storage device such that the gaming data is distributed across a plurality of storage systems. To access specific gaming data, an end user must communicate with the correct storage system. The storage systems often are accessible via a visual user interface (UI) that enables the end user to manually query the storage system for the gaming data that the end user is seeking.

However, the process of identifying the correct storage system to access and using the corresponding UI may be cumbersome and agitating to the end user, and the process may cause the end user to abandon their query out of frustration. That is, each UI might require the end user's query to be submitted in a respective format. The format of the query may vary between different UIs, thereby causing confusion for the end user. In addition, if the end user is unsure where the gaming data is located, the UIs may not provide clear directions to the end user as to which storage system is the correct system to access. Confusing the end user or otherwise limiting the end user's ability to access gaming data efficiently may cause the end users to abandon subsequent use of the gaming data. Accordingly, there is a need to improve the end user's ability to access the gaming data stored in a plurality of distributed storage systems.

SUMMARY OF THE INVENTION

According to one aspect of the present disclosure, a natural language processing (NLP) system for a wagering game environment is described herein. The NLP system includes a first network interface, a second network interface, and logic circuitry communicatively coupled to the first network interface and the second network interface. The first network interface is communicatively coupled to a plurality of user channels that receive natural language (NL) input in a colloquial format from end users for requesting wagering game data. The second network interface is communicatively coupled to a plurality of wagering game channels. Each wagering game channel is associated with at least one type of wagering game data. The logic circuitry: (i) receives, via the first network interface, a user query including the NL input associated with an end user from a first user channel, (ii) in response to the user query, selects a first NLP application that processes user queries of the first user channel from a plurality of NLP applications, (iii) transforms, using the first NLP application, the NL input of the user query into a plurality of language tokens, (iv) formulates a command trigger that is based on the plurality of language tokens, includes a first portion of the language tokens, and excludes a second portion of the language tokens, (v) determines that the command trigger is linked to a command executable by a first wagering game channel of the wagering game channels by comparing the command trigger to a plurality of available commands of the wagering game channels, (vi) generates a command query that incorporates the command and is structured in a predetermined format compatible with the first wagering game channel to execute the command, (vii) receives, from the first wagering game channel, a command reply including wagering game data associated with the command, (viii) generates, using the first NLP application, an NL response that includes the wagering game data and is structured in a colloquial format consistent with the colloquial format of the NL input of the user query, and (ix) transmits the NL response to the end user via the first network interface and the first user channel.

According to another aspect of the disclosure, a wagering game data system for providing wagering game data to end users is described herein. The wagering game data system includes a first wagering game channel and an NLP system communicatively coupled to the first wagering game channel and a first user channel that receives NL input from end users to request wagering game data. The first wagering game channel stores at least one type of wagering game data and is associated with a set of available commands. The NLP system includes logic circuitry that receives a user query requesting wagering game data from an end user via the first user channel. The user query includes NL input including a plurality of phrases in a colloquial format from the end user. The logic circuitry further selects, in response to the user query, a first NLP application that processes user queries of the first user channel from a plurality of NLP applications, and transforms, using the first NLP application, the NL input of the user query into a plurality of language tokens. Each language token represents a respective phrase from the NL input. The logic circuitry also extracts a command trigger from the language tokens by identifying at least one meaningful phrase from the language tokens and converting the at least one meaningful phrase into the command trigger, and identifies a command linked to the command trigger by comparing the command trigger to the set of available commands of the first wagering game channel. The command includes a command input to provide the first wagering game channel with data associated with the NL input. The logic circuitry further extracts a language token from the language tokens to incorporate the language token into the command input of the command, generates a command query that incorporates the command and is structured in a predetermined format compatible with the first wagering game channel to execute the command, transmits the command query to the first wagering game channel to cause the first wagering game channel to execute the command of the command query, receives, from the first wagering game channel, a command reply including wagering game data associated with the command, generates, by the first NLP application, an NL response that includes the wagering game data and is structured in a colloquial format consistent with the colloquial format of the NL input of the user query, and transmits the NL response to the end user via the first user channel.

According to yet another aspect of the disclosure, a method for providing wagering game data from wagering game environments in response to NL input from end users using an NLP system is described herein. The method is at least partially performed by logic circuitry of the NLP system. The method includes receiving, from a first user channel of a plurality of user channels, a user query that is associated with an end user requesting wagering game data and includes NL input in a colloquial format, selecting, in response to user query, a first NLP application that processes user queries from the first user channel from a plurality of NLP applications, transforming, using the first NLP application, the NL input of the user query into a plurality of language tokens, extracting a command trigger that includes a first portion of the language tokens and excludes a second portion of the language tokens from the language tokens, determining that the command trigger is linked to a command executable by a first wagering game channel of a plurality of wagering game channels by comparing the command trigger to a plurality of available commands executable by the plurality of wagering game channels, generating a command query that incorporates the command and is structured in a predetermined format compatible with the first wagering game channel to execute the command, receiving, in response to transmitting the command query to the first wagering game channel, a command reply including wagering game data associated with the command from the first wagering game channel, generating, using the first NLP application, an NL response that includes the wagering game data and is structured in a colloquial format consistent with the colloquial format of the NL input of the user query, and transmitting the NL response to the end user via the first user channel.

Additional aspects of the disclosure will be apparent to those of ordinary skill in the art in view of the detailed description of various embodiments, which is made with reference to the drawings, a brief description of which is provided below.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

As used herein, the term "natural language" refers to messages in a colloquial format. That is, a natural language message may not be structured for data processing, but rather is structured for conversation (i.e., a colloquial format), such as in one or more sentences. As used herein, "colloquial format" refers to the conversational structure of these messages. These messages, when audibly or textually expressed, are intended for human understanding. An example of a natural language message would be, "Show me my high score last week in Casino A." Natural language messages may include words and characters that are irrelevant from a data processing standpoint (e.g., "me" and "in" from the above example), yet these words and characters provide colloquial context and understanding to the message. As such, computing devices programmed to receive and/or provide natural language messages with an end user are intended to mimic human interaction by adding a layer of abstraction between the end user and the underlying data processing formats required to execute computing instructions based on the messages.

As used herein, "natural language processing" refers to techniques, processes, and applications that translate natural language messages to data processing formats and vice versa. That is, natural language processing bridges the layer of abstraction provided by natural language messages. As a result, natural language processing enables an end user to request computing functions to be executed using natural language messages, thereby potentially increasing the end user's comfort relative to navigating a UI to execute the computing functions. It is to be understood that the above description is for exemplary purposes only and is not intended to limit the meaning of the terms "natural language", "colloquial format", and "natural language processing."

The systems and methods described herein enable an end user to request wagering game data (e.g., player track data, operational data, etc.) by providing a natural language request to a centralized platform and receiving the requested wagering game data in a natural language or colloquial format. By providing a centralized platform configured to facilitate natural language communication, the systems and methods described herein reduce or otherwise eliminate the need for dedicated user interfaces (UIs) at the game data storage systems. In addition, the systems and methods provide the end user with an experience similar to speaking with a human attendant, thereby potentially reducing the end user's confusion and increasing the end user's comfort during the interaction.

As described herein, in at least one embodiment, a gaming system includes a natural language processing (NLP) system and a plurality of wagering game channels that store wagering game data. The NLP system of the gaming system is communicatively coupled to a plurality of user channels that receive natural language (NL) input from end users. The NLP system receives the NL input from the user channels, determines which user channel that the NL input originates from, and transforms the NL input into a plurality of discrete language tokens (e.g., words or characters) using an NLP application associated with the originating user channel. The language tokens are used to identify a command or request (e.g., to retrieve a particular type of wagering game data) and to generate a corresponding command query for the wagering game channel associated with the command. The command query is structured according to a predetermined format associated with the receiving waging game channel. In response to the NLP system transmitting the command query, the wagering game channel then executes the command and provides a command reply that may include wagering game data associated with the command. To provide this wagering game data back to the end user, the NLP system extracts the wagering game data from the command reply and generates a natural language response including the extracted wagering game data. The natural language response is structured in a colloquial format consistent with the colloquial format of the NL input from the end user such that, when the natural language response is transmitted back to the originating user channel, the user channel provides the response to the end user via audio output and/or textual output to mimic a human conversation.

The technical problems addressed by the systems and methods described herein may include, but are not limited to: (i) limited capability for processing queries from end users; (ii) increased computing, storage, and/or network resource allocation to various UIs; (iii) incompatibility with end user queries due to various data structures and configurations of the storage devices; and (iv) increased computing, storage, and/or network resource allocation to dedicated authentication services for the various storage devices.

The systems and methods described herein provide a technical solution to the foregoing technical problems. For example, the solution provided by the disclosed systems and methods may include, but is not limited to: (i) increase capability handling end user queries by accepting natural language input from various sources and structuring the input into machine-readable structures for data processing; (ii) reducing the computing, storage, and/or network resource burden caused by UIs by providing a single integrated platform for accepting user queries, thereby reducing or otherwise eliminating UIs specific to a particular storage device; (iii) increased flexibility to add additional storage devices without disrupting or altering the end user's interaction with the integrated platform; and/or (iv) reducing the computing, storage, and/or network resource burden caused by various authentication services by providing centralized authentication via the integrated platform.

Figure 1:
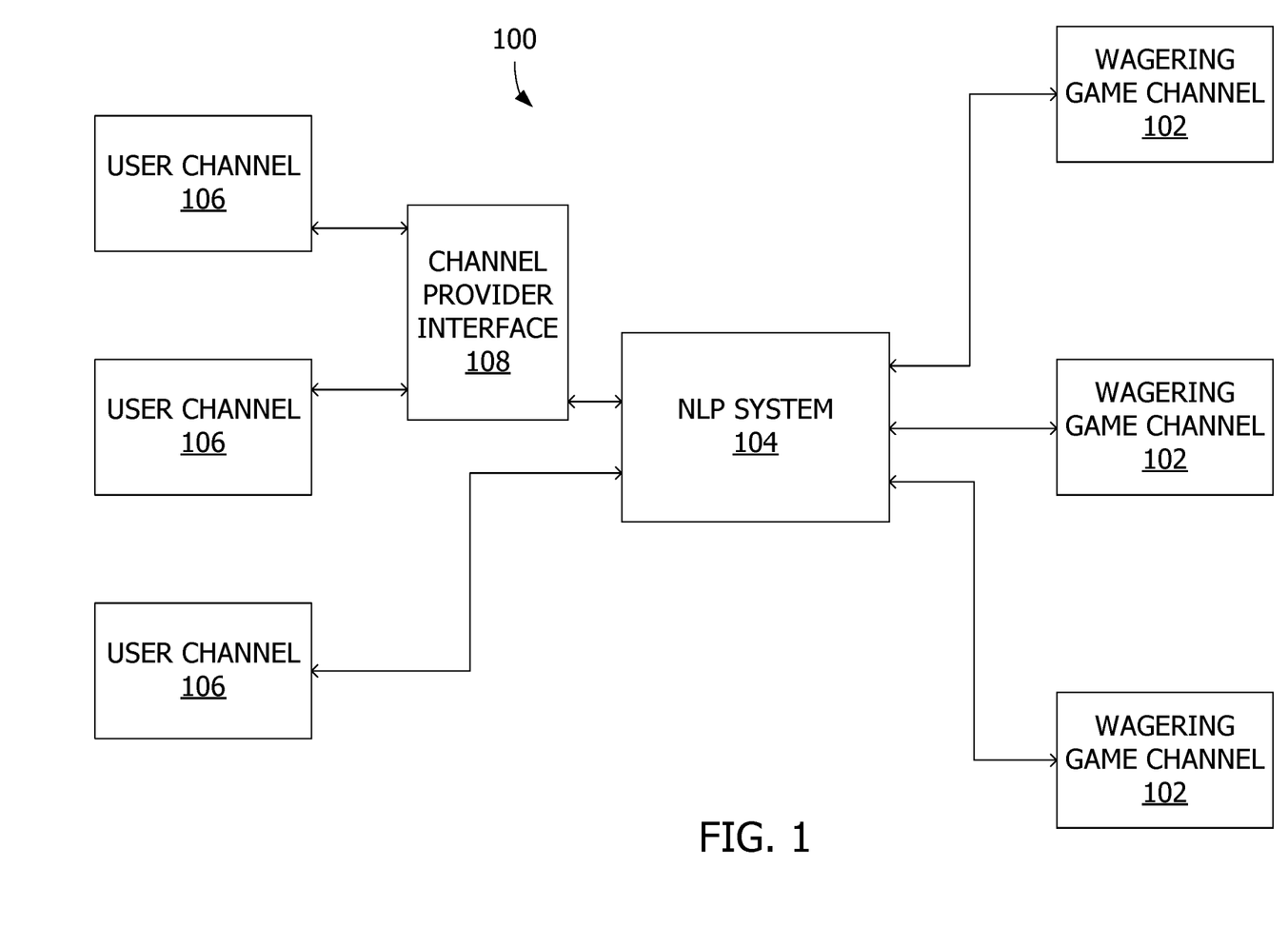
FIG. 1 is a block diagram of an example gaming system according to an embodiment of the present invention.

FIG. 1 is a schematic block diagram of an example wagering game data system 100. In the example embodiment, the system 100 includes a plurality of wagering game channels 102 communicatively coupled to a natural language processing (NLP) system 104. In other embodiments, the system 100 may include additional, fewer, or alternative subsystems, including those described elsewhere herein.

The wagering game channels 102 are configured to store wagering game data, such as player tracking data, game device operation data, game sales data, or other data associated with a gaming environment. As used herein, a "channel" refers to one or more computing devices, network devices, databases, and/or storage devices that operate together to provide one or more functions. These functions may include, for example, storing wagering game data, generating wagering game data, controlling games devices, or initiating new game sessions. Each wagering game channel 102 is associated with one or more types of wagering game data and, for at least some game channels 102, may be associated with a particular gaming establishment or geographical region. As used herein, a "type of wagering game data" refers to wagering game data that can be grouped according to the function of the data (e.g., player tracking data) or one or more elements of the data, such as the location from which the data was collected. For example, one game channel 102 may be associated with player tracking data at a particular casino such that the game channel 102 collects and stores player tracking data from the casino. In another example, a game channel 102 is associated with device operational data of a particular game device provider collected from multiple locations such that the game channel 102 collects device operational data from game devices sold by the game device provider that are in the multiple locations.

Each wagering game channel 102 is associated with a corresponding set of available commands. As used herein, a "command" refers to one or more computing instructions provided to the wagering game channels 102 that, when executed by the wagering game channel 102, causes the game channels 102 to perform one or more functions. In one example, a command is a computing expression that calls one or more computing functions when executed by a wagering game channel 102. An example command may cause one wagering game channel 102 to retrieve wagering game data in accordance with one or more parameters provided in the command. The commands for the wagering game channels 102 have predetermined formats specified by corresponding wagering game channels 102 to enable the game channels 102 to identify the command, extract data from the command, and execute the command properly. These formats may vary between different wagering game channels 102 due to, for example, different regulations, different commands, different administrators of the wagering game channels 102, and/or different system architecture within the wagering game channels 102.

The NLP system 104 is communicatively coupled with each wagering game channel 102 to provide commands to the wagering game channels 102 and to receive wagering game data from the game channels 102. In at least some embodiments, the NLP system 104 may be configured to cause one or more wagering game channels 102 to perform other functions, such as controlling a wagering game device, via commands. The NLP system 104 is configured to store information associated with each wagering game channel 102 to facilitate communication, including a list of available commands. In the example embodiment, the NLP system 104 collects the available commands associated with a wagering game channel 102 during an initial configuration of the game channel 102. In some embodiments, the initial configuration is automatic or semi-automatic such that the wagering game channel 102 automatically provides the list of available commands to the NLP system 104 and/or the NLP system 104 allocates a predetermined set of commands to the wager game channel 102. In certain embodiments, the configuration of the game channel 102 may be performed by an authorized operator.

The NLP system 104 operates as a centralized platform for accessing the wagering game channels 102, and thus, an end user can access the wagering game channels 102 via the NLP system 104. In certain embodiments, the NLP system 104 has a centralized interface (e.g., a UI) that enables end users to access the various wagering game channels 102. In the example embodiment, the NLP system 104 is communicatively coupled to a plurality of user channels 106 to communicate with end users. The user channels 106 are configured to receive input from end users and transmit the input to the NLP system 104 for processing. More specifically, the NLP system 104 is configured to identify one or more commands associated with the input from the end users and to cause the wagering game channels 102 to execute the identified commands in response to the user input. At least one user channel 106 is configured to receive natural language input from end users. Examples of user channels 106 that receive natural language input may include, but are not limited to, computing devices programmed to include voice assistants and/or text-based chat applications. The natural language input is text-based and/or audio-based messages structured in a colloquial format. That is, the end user provides the user channel 106 with a conversational message to access the wagering game channels 102.

The colloquial structure of the natural language input generally is not directly compatible with the predetermined data formats of the commands of the wagering game channels 102 such that providing the natural language input directly to the wagering game channels 102 may result in errors or no action by the wagering game channels 102. In the example embodiment, the NLP system 104 is configured to translate or transform the natural language input into a data format to identify the corresponding command of the intended recipient wagering game channel 102. The NLP system 104 may then cause the game channel 102 to execute the identified command and respond accordingly to the end user. In at least some embodiments, the NLP system 104 also is configured to translate the response to the end user into a natural language output to be provided by the originating user channel 106 to the end user.

In the example embodiment, the NLP system 104 is communicatively coupled to at least some user channels 106 via one or more channel provider interfaces 108 associated with providers of the user channels 106. The channel provider interfaces 108 are configured to route data communication traffic from the user channels 106 to systems like the wagering game data system 100. In at least some embodiments, the channel provider interface 108 is configured to perform preliminary natural language processing of natural language input to determine if the natural language input from an end user is directed to the system 100 or another system configured for natural language processing. The channel provider interface 108 may also add or remove metadata included with the natural language input for security purposes, identification purposes, and/or other data processing purposes. For example, the channel provider interface 108 may generate an identifier to identify the originating user channel 106 and/or the provider of the user channel 106.

Figure 2:
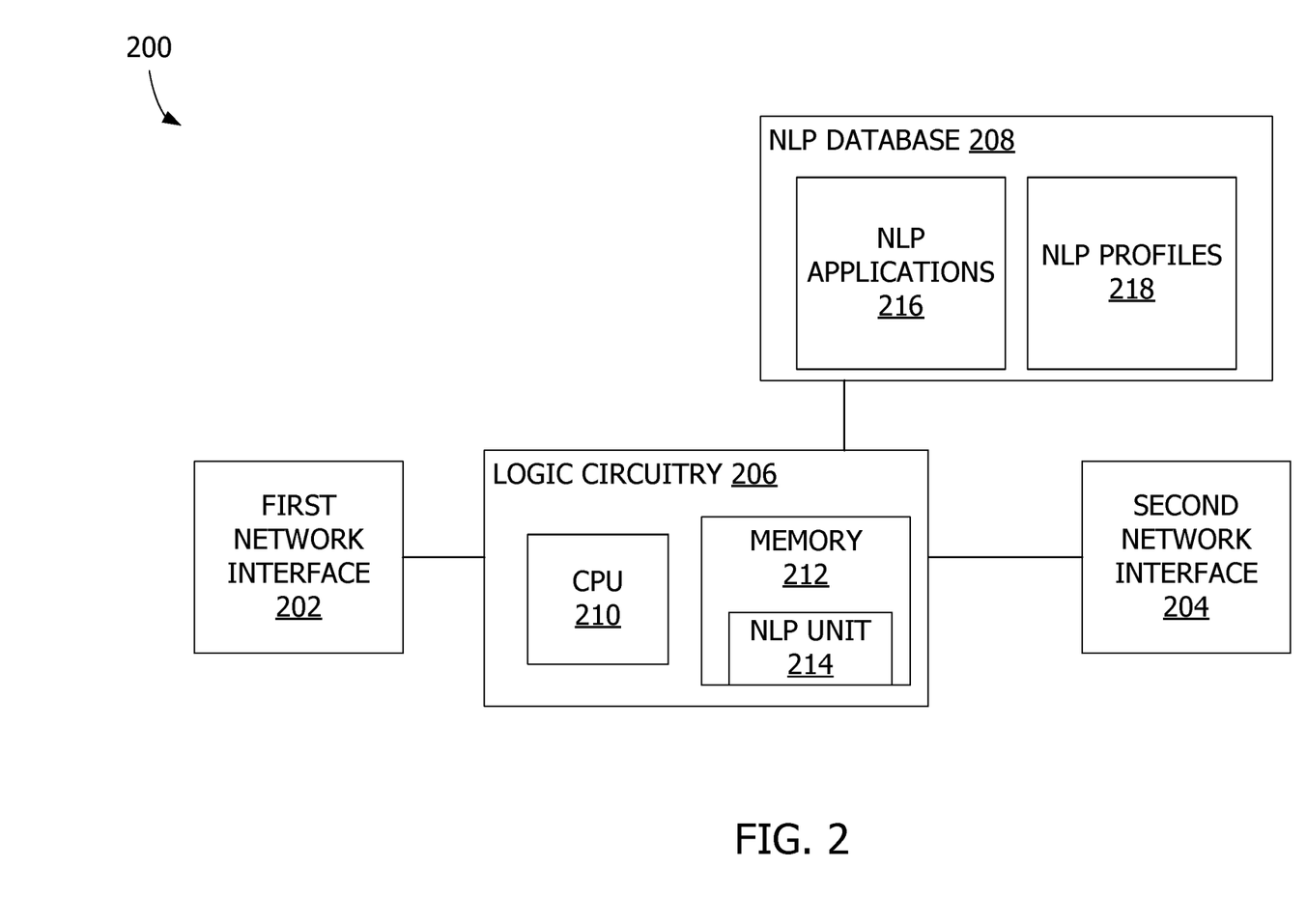
FIG. 2 is a block diagram of a natural language processing (NLP) system according to an embodiment of the present invention.

FIG. 2 is a schematic block diagram of an example NLP system 200 of a wagering game data system, such as the system 100 (shown in FIG. 1). In the example embodiment, the NLP system 200 includes a first network interface 202, a second network interface 204, logic circuitry 206, and an NLP database 208. In other embodiments, the NLP system 200 includes additional, fewer, or alternative subsystems, including those described elsewhere herein.

The first network interface 202 is communicatively coupled between the logic circuitry 206 and the user channels (e.g., user channels 106, shown in FIG. 1) in communication with the system 200. The first network interface 202 includes one or more routers, switches, servers, and/or other networking devices to facilitate data communication between the NLP system 200 and the user channels. In some embodiments, the first network interface 202 is configured to provide closed network communication. That is, user channels and channel provider interfaces are required to be authorized prior to communicatively coupling to the first network interface 202. Alternatively, the first network interface 202 is configured to provide open network communication such that user channels and channel provider interfaces can communicate with the first network interface 202 without prior authorization.

The second network interface 204 is communicatively coupled between the logic circuitry 206 and the wagering game channels (e.g., channels 102, shown in FIG. 1) communicatively coupled to the system 200. Similar to the first network interface 202, the second network interface 204 includes one or more network devices to facilitate data communication and may be configured to provide open or closed network communication with the wagering game channels. In the example embodiment, the second network interface 204 is configured to provide closed network communication with the wagering game channels. During an initial configuration, the second network interface 204 (or the logic circuitry 206 via the network interface 204) may request information from the wagering game channel to enable the system 200 to operate as described herein.

The logic circuitry 206 includes a central processing unit (CPU) 210 connected to a main memory 212 that comprises one or more memory devices. The CPU 210 includes any suitable processor(s), such as those made by Intel and AMD. Although a single CPU 210 and a single main memory 212 are shown in FIG. 2, it is to be understood that the logic circuitry 206 may include a plurality of CPUs 210 and/or a plurality of memories 212 in some embodiments. In such embodiments, the CPUs 210 and/or the main memories 212 may have the same or different architectures. By way of example, the CPU 210 includes a plurality of microprocessors including a master processor, a slave processor, and a secondary or parallel processor. In one example, the logic circuitry 206 is a distributed system including a plurality of server computing devices that operate together or independently with their own CPUs 210 and main memories 212. In embodiments with distributed logic circuitry 206, the server computing devices may be communicatively coupled together to distribute tasks amongst each other. In some embodiments, the network interfaces 202, 204 are configured to distribute data traffic passing through the NLP system 200 across the server computing devices to reduce the processing and networking burden on a particular server computing device.

The logic circuitry 206, as used herein, comprises any combination of hardware, software, or firmware that is configured to facilitate the functions described herein. For example, the logic circuitry 206 may include network interfaces for communicating with the network interfaces 202, 204. The logic circuitry 206, and more specifically the CPU 210, comprises one or more controllers or processors and such one or more controllers or processors need not be disposed proximal to one another and may be located in different devices or in different locations. The logic circuitry 206, and more specifically the main memory 212, comprises one or more memory devices which need not be disposed proximal to one another and may be located in different devices or in different locations. The logic circuitry 206 is operable to execute all of the various NLP methods and other processes disclosed herein. That is, the functions and processes performed by the NLP system 200 as described herein are at least partially executed by the logic circuitry 206. In the example embodiment, the main memory 212 stores machine-readable instructions that, when executed by the CPU 210, cause the logic circuitry 206 to perform the functions and processes described herein. The main memory 212 includes an NLP unit 214. In one embodiment, the NLP unit 214 is configured to store instructions that, when executed by the CPU 210, enable the CPU 210 to process natural language messages and/or perform other tasks associated with the functions of the NLP system 200 described herein.

The NLP database 208 is communicatively coupled to the logic circuitry 206. In some embodiments, the NLP database 208 is part of the logic circuitry 206 (e.g., part of the main memory 212). In at least some embodiments, the NLP database 208 is a distributed database system communicatively coupled to the logic circuitry 206. In the example embodiment, the NLP database 208 is configured to store data and applications for processing natural language messages. More specifically, the NLP database 208 is configured to store one or more NLP applications 216 executable by the logic circuitry 206. An NLP application 216 is an application program interface (API) or other suitable software for transforming data between a natural language format and a machine-readable format. In one example, the NLP application 216 is configured to analyze an audio message in a natural language format, convert the audible words to text, and identify one or more characters or phrases from the text that is relevant to a particular command. In another example, the NLP application 216 extracts data from machine-readable message, formulate a natural language message incorporating the extracted data, and transmit the natural language message to an end user.

In the example embodiment, each NLP application 216 is configured to process natural language messages associated with specific user channels, specific channel providers of the user channels, and/or specific types of natural language messages (e.g., text-based and/or audio-based). That is, the NLP application 216 may be specialized to handle different data protocols of the user channels and different types of natural language messages. In other embodiments, the NLP database 208 may store a global NLP application 216. Storing the NLP applications 216 in the NLP database 208 enables the logic circuitry 206 to retrieve the applicable NLP application 216 to process a natural language message.

The logic circuitry 206 is configured to use artificial intelligence, machine learning, and/or other techniques that enable the logic circuitry to improve its capability to process natural language messages. At least some artificial intelligence and/or machine learning may be incorporated by the NLP applications 216. For example, artificial intelligence and machine learning may be used for pattern recognition in processing natural language messages based on previously processed messages. In the example embodiment, the NLP database 208 stores one or more NLP profiles 218 that map natural language to associated machine-readable elements and vice versa. For example, the NLP profiles 218 may store a list of synonymous natural language terms that correspond to a particular instruction or command. When the NLP application 216 processes one of the natural language terms, the NLP application 216 may reference the corresponding NLP profile 218 to identify the linked command. The NLP profiles 218 may incorporate historical natural language messages and machine-readable commands to enable the NLP system 200 to adapt over time. The NLP profiles 218 may be configured to share historical data with each other. In at least some embodiments, the NLP system may perform a plurality of simulated operations to improve the robustness of the NLP profiles 218. In some embodiments, each NLP profile 218 is associated with a particular user channel or channel provider. In other embodiments, the NLP profiles 218 are associated with respective NLP applications 216. In further embodiments, the NLP system 200 may include a global NLP profile 218.

The NLP system 200 may include additional peripheral devices or more than one of each component shown in FIG. 2. Any component of the system architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
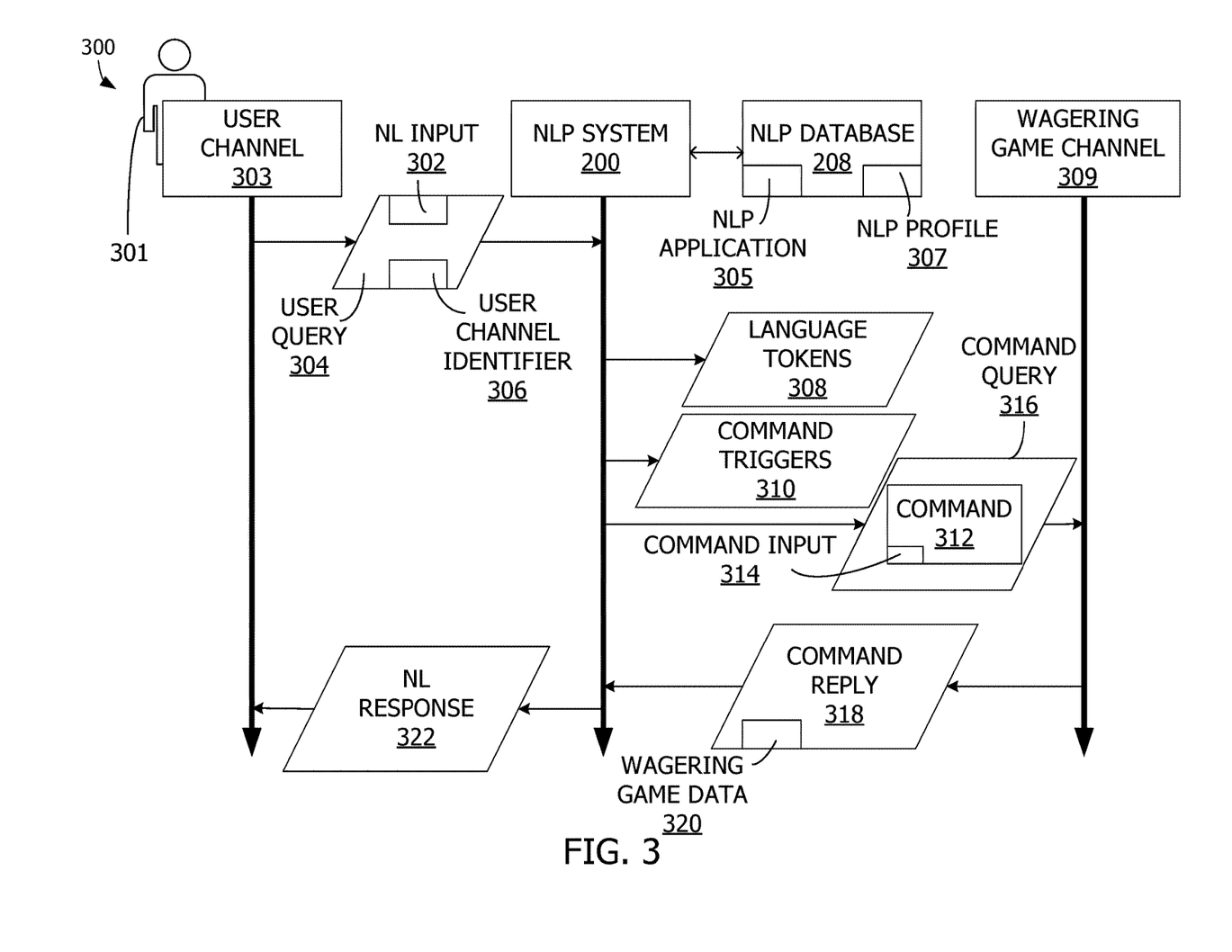
FIG. 3 is a data flow diagram of an example method for processing natural language input from an end user requesting wagering game data according to an embodiment of the present invention.

FIG. 3 is a data flow diagram of an example natural language processing method 300 performed by the NLP system 200 shown in FIG. 2. More specifically, the method 300 enables an end user 301 to request wagering game data via the NLP system 200 using natural language and receive the data in a natural language format. The method 300 may include additional, fewer, or alternative steps, including those described elsewhere herein.

In the example embodiment, a first user channel 303 receives NL input 302 from the end user 301. The NL input 302 is a text-based or audio-based message requesting wagering game data (or requesting another operation associated with wagering games be performed). That is, the NL input 302 includes one or more words, phrases, characters, and the like that are organized in a colloquial format to request the wagering game data. As used herein, a "phrase" is used to refer a word, character, or combinations thereof. In one example, the NL input 302 is one or more sentences spoken by the end user 301 to the first user channel 303.

In at least some embodiments, the first user channel 303 or a channel provider interface (not shown in FIG. 3) associated with the user channel 303 performs a preliminary analysis of the NL input 302 to identify an intended recipient system, such as the wagering game data system including the NLP system 200. That is, the first user channel 303 or the channel provider interface identifies the phrases in the NL input 302 and, based on the identified phrases, determines an intended recipient. When the recipient system is identified as the wagering game data system, the user channel 303 (or the channel provider interface) generates a user query 304 that includes the NL input 302 and any other metadata to facilitate network communication and data processing as described herein. In some embodiments, the metadata identifies the end user 301, such as by providing his or name, email address, username, and the like. In the example embodiment, the user query 304 also includes a user channel identifier 306. The user channel identifier 306 is associated with the first user channel 303 and/or the channel provider interface of the first user channel 303. The user channel identifier 306 enables the NLP system 200 to identify the origin of the user query 304. The identifier 306 may be, for example and without limitation, a unique code or network characteristics (e.g., network ports, addresses, masks, etc.) associated with the user channel 303 and/or its channel provider.

Upon receiving the user query 304 and identifying the first user channel 303 as its origin based on the user channel identifier 306, the NLP system 200 is configured to extract the NL input 302 from the query 304 and select a first NLP application 305 from the NLP database 208 (shown in FIG. 2) from a plurality of NLP applications. That is, the NLP system 200 retrieves an NLP application compatible with processing natural language messages associated with the first user channel 303 from the NLP database 208. In some embodiments, the NLP applications are not stored in the NLP database 208, but rather are stored locally (e.g., within the logic circuitry 206, shown in FIG. 2). The NLP application 305 is configured to process the NL input 302 into a machine-readable format for a comparison described herein. In certain embodiments, at least some of the functions performed using the NLP application 305 may be performed using a different application, software package, or set of computer instructions. For example, the NLP unit 214 (shown in FIG. 2) may be configured to store another NLP application or other application to perform the functions described herein.

In the example embodiment, when the logic circuitry 206 (shown in FIG. 2) executes the NLP application 305, the NLP system 200 transforms or converts the NL input 302 into a plurality of discrete language tokens 308. The language tokens 308 are machine-readable data elements that represent the characters, words, and/or phrases within the NL input 302. It is to be understood that a language token 308 may refer to a collective group of data elements (e.g., an array of data elements). In one example, each word within the NL input 302 is stored as a language token 308 such that spaces between words are discarded. Each word may be stored as an array of letters. In another example, the NL input 302 is divided into phrases such that multi-word phrases are stored as a single token 308, or a phrase may encompass single and multi-word phrases and redundancies. In the example embodiment, the machine-readable format of the language tokens is the American Standard Code for Information Interchange (ASCII) format. In other embodiments, the machine-readable format may be a different suitable format. The language tokens 308 may also include other information, such as the order in which the words or characters were provided within the NL input 302.

In one example, for text-based NL inputs 302, the NLP system 200 parses the text for each phrase, word, or character and then stores each phrase, word, or character as a language token 308. In some embodiments, the text-based NL input 302 may already be in the machine-readable format (e.g., ASCII format). In other embodiments, the text-based NL input 302 is converted to the predetermined machine-readable format. In another example, for audio-based NL inputs 302, the NLP application 305 enables the NLP system 200 to use audio processing techniques to identify characters and/or words within the audio signal of the NL input 302. The language tokens 308 are then generated using the identified characters and/or words.

Although the language tokens 308 are in a machine-readable format, the language tokens 308 may not be formatted properly to cause a wagering game channel to execute a command. Using the NLP application 305, the NLP system 200 parses the language tokens 308 to extract one or more command triggers 310. "Extracting" the command triggers 310 from the language tokens may include, but is not limited to, discarding language tokens 308 that only serve to provide colloquial context (e.g., articles, conjunctions, etc.), identifying relevant language tokens 308 (i.e., identifying meaningful phrases represented by the tokens 308), and, in at least some cases, converting one or more language tokens 308 to a format compatible with the commands. That is, the NLP application 305 interprets the NL input 302 into a predetermined format as the command triggers 310 to compare with commands of the wagering game channels as described herein. In other embodiments, the NLP system 200 uses a separate application or set of machine-readable instructions other than the NLP application 305 to extract the command triggers 310 from the language tokens 308.

In one example, the NL input 302 is, "Show me my high score yesterday at the Casino A" and each word is a language token 308. The NLP system 200, executing the NLP application 305, analyzes the language tokens 308 and identifies several meaningful phrases across multiple tokens 308 (e.g., "high score" and "Casino A"). The NLP system 200 also identifies "show", "my", and "yesterday" as meaningful or relevant phrases. "Me", "at", and "the" provide colloquial context to the NL input 302 but are not relevant for the purposes described herein. The NLP system 200 then creates the command trigger 310 by interpreting (i) "show", "high score", and "Casino A" as a request for wagering game data related to a game high score at Casino A; (ii) "my" as the name of the player; and (iii) "yesterday" as yesterday's date. This interpretation enables the NLP system 200 to identify synonymous words or phrases in the NL input 302 and covert these words or phrases into a corresponding command trigger 310 (e.g., "show" or "give" would be converted to a command trigger 310 having a similar meaning). In certain embodiments, the command trigger 310 includes abstractions of the language tokens 308. That is, instead of converting "yesterday" to yesterday's date, the NLP system 200 may formulate the command trigger 310 to indicate that a date restriction is requested.

In the example embodiment, the NLP application 305 uses an NLP profile 307 to convert the NL input 302 to the language tokens 308 in addition to extracting the command trigger 310. More specifically, the NLP profile 307 includes historical data to identify characters, words, and/or phrases in the NL input 302 and facilitates interpreting the language tokens 308 into the command trigger 310. The NLP profile 307 may link or map various NL inputs 302 to language tokens 308 and/or map language tokens 308 to command triggers 310 using, for example, a neural network and/or other mapping or pattern-recognition techniques. The historical data stored by the NLP profile 307 may include historical language tokens and command triggers to enable the NLP application 305 to dynamically adjust how the command triggers are formulated. The NLP profile 307 is configured to be updated via simulated interactions and feedback provided during operation as described herein.

In the example embodiment, the command trigger 310 is compared to a set of available commands stored in the NLP database 208 to identify a command 312 linked to the command trigger 310. The list of commands and the command trigger 310 are formatted for comparison with each other. That is, the predetermined format of the command trigger 310 substantially matches the formatting of the list of commands to facilitate accurate identification of the command 312. The NLP system 200 determines a relevancy of the command trigger 310 to each command based on the comparison and identifies the most relevant command 312 to the command trigger 310. In one embodiment, the NLP system 200 generates relevancy scores for each comparison and selects one of the commands with the most relevant score. In at least some embodiments, the NLP system 200 uses the NLP profile 307 to link command triggers to commands. That is, the NLP profile 307 stores a historical record of command triggers linked to commands that is used as a reference when comparing the command trigger 310 to the available commands. In another embodiment, the NLP system 200 identifies the command 312 if the command 312 substantially (or entirely) matches the command trigger 310. If multiple command triggers 310 are extracted from the language tokens 308, then the NLP system 200 performs comparisons for each respective command trigger 310 to identify the corresponding commands 312.

The command 312 is associated with a particular wagering game channel 309. More specifically, the wagering game channel 309 is configured to perform one or more functions in response to command 312. As a result, the wagering game channel 309 is identified as the intended recipient of the command 312. The command 312 is structured in a predetermined format compatible with the wagering game channel 309. The command 312 is at least partially predefined such that the predefined portion of the command 312 remains the same irrespective of the data within the language tokens 308 and/or the command trigger 310. For example, some commands are entirely predefined such that the function performed by the wagering game channel 309 does not change based on the information provided by the end user 301 in the NL input 302. Other commands include one or more command inputs that facilitate passing data from the language tokens 308 and/or the command trigger 310 to the wagering game channel 309 as parameters to complete the functions activated by the command.

In the example embodiment, the command 312 includes a command input 314 to tailor the command 312 to the parameters provided in the language tokens 308 and/or the command trigger 310. The command input 314 may include, but is not limited to, a player's name or identifier, a gaming establishment identifier, a game identifier, a gaming machine or device identifier, an employee identifier, changed game settings, and/or a time and date. The command input 314 may include data extracted from one or more language tokens 308 and/or the command trigger 310. In at least some embodiments, the command input 314 may include data extracted or generated from other sources, such as data stored in the NLP profile 307.

In the example embodiment, the NLP system 200 is configured to generate a command query 316 incorporating the command 312 for the wagering game channel 309. In embodiments in which multiple commands 312 where identified for multiple command triggers 310, the NLP system 200 generates a command query 316 for each command 312. The command query 316 is structured in a predetermined format compatible with the wagering game channel 309 to execute the command 312. That is, the command query 316 is formatted such that when the wagering game channel 309 receives the query 316, the wagering game channel 309 properly identifies and executes the command 312. In addition to the command 312, the command query 316 may include, for example, networking metadata to facilitate routing the query 316 to the correct wagering game channel 309 via a network interface (e.g., the network interface 204, shown in FIG. 2). In some embodiments, a single command query 316 may be configured to include a plurality of commands 312 for the wagering game channel 309.

After the command query 316 is generated, the NLP system 200 transmits the query 316 to the wagering game channel 309. The wagering game channel 309 is configured to execute the command 312 and, in at least some embodiments, generate a command reply 318. The command reply 318 may indicate a result of the command 312 (e.g., indicating that a game setting has been changed) and/or may include wagering game data responsive to the command 312. In the example embodiment, the command reply 318 includes wagering game data 320 associated with the command 312. In one example, the command 312 is a request for the wagering game data 320 stored by the wagering game channel 309 (i.e., a lookup query), and the game channel 309 retrieves the wagering game data 320 based on the command inputs 314 of the command 312. The wagering game channel 309 transmits the command reply 318 with the wagering game data 320 back to the NLP system 200 to provide the game data 320 to the end user 301.

The NLP system 200 is configured to extract the wagering game data 320 from the command reply 318 and generate an NL response 322 that includes the wagering game data 320. The NL response 322 is a message for providing the wagering game data 320 to the end user in a colloquial format via the user channel 303. By structuring the NL response 322 in a colloquial format, the NLP system 200 mimics a human conversation with the end user 301. That is, from the perspective of the end user 301, the NL response 322 is provided in response to the NL input 302. In the example embodiment, the NLP system 200 uses the first NLP application 305 to structure the NL response 322 in a colloquial format consistent with the colloquial format of the NL input 302. More specifically, the NLP system 200 analyzes the NL input 302, the command 312, and/or the wagering game data 320 and formulates the NL response 322 to provide an appropriate conversational response to the NL input 302. In one example, the end user 301 requests data using slang or synonymous terminology. In this example, the wagering game data 320 and/or the command 312 may use terms inconsistent with the terminology of the end user 301. The NLP system 200 converts the terminology of the game data 320 and the command 312 to match the terminology of the end user 301 when generating the NL response 322. If multiple command replies 318 were received in response to multiple commands 312, the NLP system 200 incorporates the wagering game data 320 and/or other data from the replies 318 together into a single NL response 322. Alternatively, the NLP system 200 may generate a separate NL response 322 for each command reply 318. In certain embodiments, the NLP system 200 may use the NLP profile 307 to store historical NL responses 322 for creating subsequent NL responses 322. In at least some embodiments, the NL response 322 is generated to match the data format of the NL input 302 (i.e., text-based and/or audio based). After the NL response 322 is generated, the NLP system 200 transmits the NL response 322 with the wagering game data 320 to the end user 301 via the first user channel 303 (and the first network interface 202, shown in FIG. 2).

Figure 4:
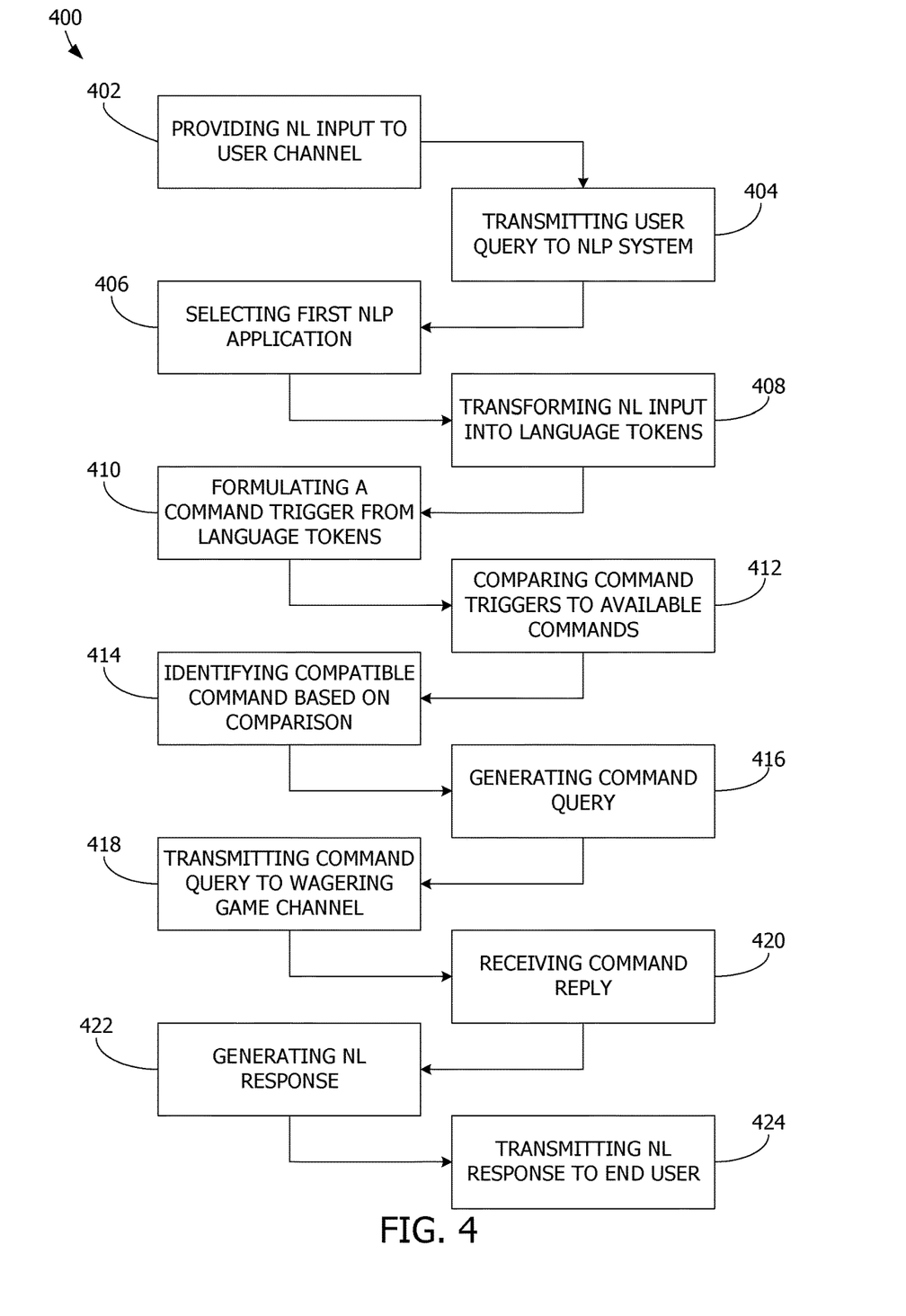
FIG. 4 is a flowchart of the example natural language processing method shown in FIG. 3 in accord with at least some aspects of the disclosed concepts.

FIG. 4 is a flow diagram 400 of one example of the process 300 described with respect to FIG. 3. In this example, the end user 301 provides 402 an audio-based NL input 302 to the first user channel 303 stating, "What was the loosest slot in Casino A yesterday?" The first user channel 303 transmits 404 the NL input 302 to the NLP system 200 as part of a user query 304 with a channel identifier 306 of the user channel 303. In response to receiving the user query 304, the NLP system 200 selects 406 the first NLP application 305 from a library of NLP applications based on the channel identifier 306 to process the NL input 302. The NLP system 200 then transforms 408 the NL input 302 into a plurality of language tokens 308. More specifically, the NLP system 200 converts the NL input 302 into a text-based input and then separates the input into the language tokens 308 using the first NLP application 305. Each word from the NL input 302 is a separate token 308, though in some embodiments, the NLP system 200 may recognize "Casino A" as a single token 308.

The NLP system 200 then formulates 410 a command trigger 310 from the language tokens 308. Although "What was the loosest slot" is not recognized as a command in this example, the NLP system 200 determines that the end user 301 is requesting data associated with a gaming machine having the highest expected value or payback percentage based on contextual clues in the phrase. In particular, the NLP system 200 references the NLP profile 307 to identify a potential meaning of "loosest slots" by reviewing potentially synonymous phrases or terms and formulates the command trigger 310 accordingly. In addition, the token 308 "yesterday," is converted into yesterday's date as part of the command trigger 310. Tokens 308 such as "What", "was", and "in" are not included in the command trigger 310, though these tokens 308 may be used by the NLP system 200 to contextualize the relevant tokens 308. The command trigger 310 in this example is formatted for comparison with a list of available commands executable by a plurality of wagering game channels. That is, the command trigger 310 identifies Casino A as the location, yesterday's date as the time range, and the machine with the highest expected value as the data requested. The NLP system 200 compares 412 the command trigger 310 to each available command until the NLP system 200 identifies 414 a command 312 compatible with the data of the command trigger 310. The command 312 is a data retrieval request from a wagering game channel 309 associated with "Casino A."

In this example, the NLP system 200 retrieves the command 312 and completes the command 312 by incorporating the time range (yesterday's date) and the data requested (machine with the highest expected value) as command inputs 314. The NLP system 200 then generates 416 a command query 316 that includes the command 312 and transmits 418 the command query to the wagering game channel 309 compatible with the command 312. The wagering game channel 309 executes the command 312 from the query 316 and transmits a command reply 318 including the requested wagering game data 320 back to the NLP system 200 in response. In this example, the wagering game data 320 includes the name of the machine with the highest expected value and any other suitable data associated with the machine (e.g., the location of the machine in Casino A). The NLP system 200 receives 420 the command reply 318 and extracts the wagering game data 320 from the reply 318. The NLP system 200 generates 422 the NL response 322 as an audio-based message incorporating the game data 320. In addition, the NLP system 200 incorporates the terminology "loosest slots" in the NL response 322 to remain consistent with the format of the NL input 302. An example NL response 322 may be, "Game A and Game B were tied as the loosest slots in Casino A yesterday." The NL response 322 is then transmitted 424 to the end user 301 via the user channel 303.

Figure 5:
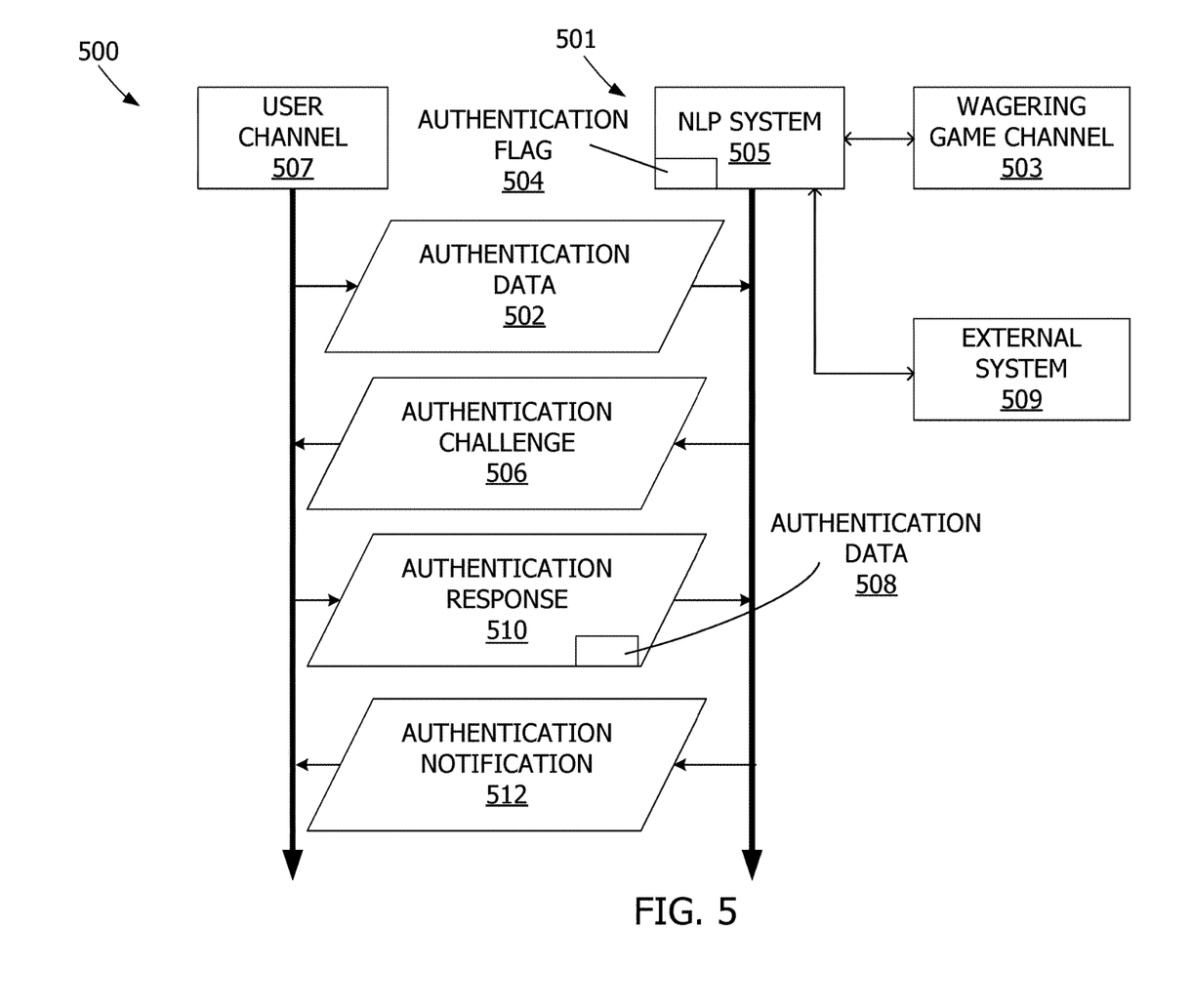
FIG. 5 is a data flow diagram of an example method for authenticating an end user in accord with at least some aspects of the disclosed concepts.

FIG. 5 is a data flow diagram of an example authentication process 500 that may be performed by a wagering game data system, such as the system 100 shown in FIG. 1. In the example embodiment, a wagering game data system 501 is configured to perform the authentication process 500. The system 501 is substantially similar to the system 100 shown in FIG. 1, and the system 501 includes a first wagering game channel 503 and an NLP system 505. The system 501 is communicatively coupled to a first user channel 507. In some embodiments, the process 500 is performed by a different wagering game data system. In certain embodiments, the process 500 includes additional, fewer, or alternative steps and/or data, including those described elsewhere herein.

At least some wagering game channels may include sensitive information or perform sensitive functions that are selectively available to end users. That is, some game channels may require an end user to be authorized to access the game channels and/or specific data stored by the game channels. In one example, an end user may only access his or her respective player tracking profile and is otherwise prevented from accessing other users' profiles. To prevent malicious users from accessing an end user's profile, the end user may be prompted to provide reference authentication data 502 during a registration process for the player-tracking profile. In other embodiments, the reference authentication data 502 is not provided by the end user, but rather the reference authentication data 502 is provided to the end user (e.g., via the wagering game data system 501). The reference authentication data 502 is data associated with the end user that verifies the end user as an authorized party. The reference authentication data 502 may include, but is not limited to, passwords, PINs, digital tokens, encryption keys, biometric data (e.g., fingerprints, facial scans, retina scans), digital audio signatures, a digital timestamp, and the like. The reference authentication data 502 may be uniquely associated with the end user (e.g., biometric data) or may be associated with the wagering game channel (e.g., a password shared by multiple end users).

The wagering game data system 501 stores the reference authentication data 502 for subsequent authentication. In some embodiments, the wagering game channels 503 store the authentication data. In other embodiments, the NLP system 505 stores the authentication data (e.g., in the NLP database 208, shown in FIG. 2). Alternatively, the reference authentication data 502 may be stored at an external system 509 communicatively coupled to the game system 501. Although the external system 509 is shown in communication with the NLP system 505, the external system 509 may be communicatively coupled to the wagering game channels 503 in at least some embodiments. In one example, the reference authentication data 502 is retrieved from the external system for the authentication process 500. In another example, the external system performs at least a portion of the authentication process 500 as described herein and provides results back to the wagering game data system 501.

In the example embodiment, when the NLP system 505 identifies the recipient wagering game channel 503 associated with the user query from an end user, the NLP system 505 determines whether or not the authentication is required to perform the command associated with the user query. In some embodiments, the NLP system 505 stores an authentication flag 504 for at least some wagering game channels 503 that indicates whether or not the corresponding game channel 503 (or command of the game channel 503) requires authentication. In other embodiments, when the NLP system 505 transmits the command to the wagering game channel 503, the wagering game channel 503 indicates to the NLP system 505 that authentication is required. Alternatively, authentication may be automatically required by the wagering game data system 501 irrespective of which wagering game channel 503 or command is associated with the user query.

The NLP system 505 is configured to transmit an authentication challenge 506 to the end user. The authentication challenge 506 prompts the end user (or a device associated with the end user) to provide authentication data. In some embodiments, the NLP system 505 transmits the authentication challenge 506 to the end user via a user channel 507. In such embodiments, the authentication challenge 506 may be formatted as a natural language message consistent with the format of the NL input provided by the end user of the user query. The challenge 506 prompts the end user for a type of authentication consistent with the type of the reference authentication data 502. That is, if the reference authentication data 502 is a password, the authentication challenge 506 requests a password from the end user. In response to the challenge 506, the end user provides the corresponding authentication data 508. In certain embodiments, the authentication challenge 506 may include encrypted data and/or data to be encrypted. In such embodiments, the encryption method or key is known by the device associated with the end user (e.g., the user channel 507), and the authentication data 508 includes the corresponding encrypted or decrypted data for authentication as described herein.

The NLP system 505 receives the authentication data 508 as part of an authentication response 510. In certain embodiments, the authentication data 508 may also be included with the NL input from the user query such that an authentication challenge 506 is not transmitted to the end user. In the example embodiment, the NLP system 505 extracts the authentication data 508 from the authentication response 510. In other embodiments, the authentication response 510 is transmitted to the wagering game channel 503 or the external system 509 for subsequent processing as described herein.

In the example embodiment, the NLP system 505 retrieves the reference authentication data 502 from storage and compares the authentication data 508 of the response 510 to the reference authentication data 502. In some embodiments, the NLP system 505 determines whether or not the authentication data 508 is an exact match to the reference authentication data 502. In other embodiments, the NLP system 505 determines whether or not the authentication data 508 is a substantial match to the reference authentication data 502. For example, if the authentication data 502, 508 are audio signatures, the audio signatures may not be identical to each other, but rather share sufficient similarities to exceed a predetermined threshold for authentication. In certain embodiments, the NLP system 505 generates one or more authentication scores based on the comparison and determines whether or not the authentication scores exceed one or more threshold scores. Based on the comparison, the NLP system 505 determines whether or not the end user is authenticated. That is, if the authentication data 508 is determined to be a match or substantive match to the reference authentication data 502, the NLP system 505 verifies the end user's identity (i.e., the end user is authenticated). Otherwise, the NLP system 505 determines the end user has failed authentication. In response to the end user being successfully authenticated, the NLP system 505 permits the user query to be processed and the NL response to be transmitted to the end user. In response to the end user being unsuccessfully authenticated, the NLP system 505 prevents the user query from being processed and/or the NL response from being transmitted. In certain embodiments, the NLP system 505 generates an authentication notification 512 indicating the result of authentication and transmits the notification 512 to the end user.

In certain embodiments, authorization to certain wagering game channels and/or certain data or functions of the wagering game channels may be restricted to one or more users, user channels, and/or time periods. That is, to access the restricted wagering game channels, an end user is required to be authorized for access or to access the wagering game channels via the authorized user channels and/or at authorized time periods. In such embodiments, the reference authentication data 502 and the authentication data 508 are at least partially from the user channel 507 (e.g., a unique device identifier). In one example, the authentication data 502, 508 are entirely composed of the data from the user channel 507 such that the authentication process 500 occurs in the background without the end user's involvement. In another example, at least some data associated with the end user and/or the wagering game channel 503 is combined with the data from the user channel 507 to form the reference authentication data 502 and the authentication data 508. In other embodiments, the identity of the originating user channel may influence authentication and/or authorization of an end user, but authentication and/or authorization may not be dependent upon the identity of the user channel remaining identical. For example, an end user attempting to access a restricted game channel 503 via a new or compromised user channel 507 may be viewed as a higher risk of fraud. In such an example, the NLP system 505 may request multi-factor authentication (i.e., multiple and distinct forms of authentication) from the end user.

Figure 6:
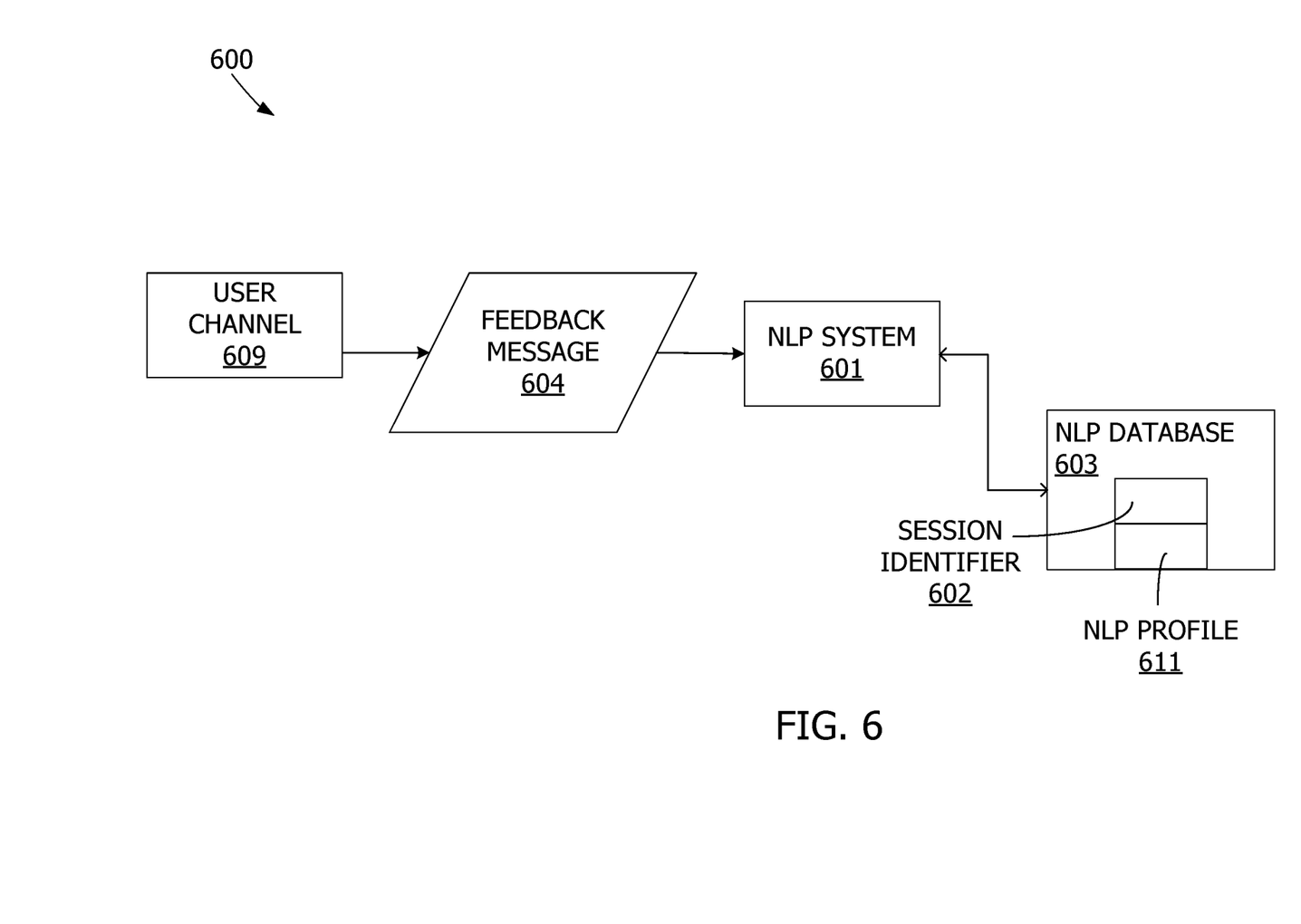
FIG. 6 is a data flow diagram of an example method for incorporating feedback into natural language in accord with at least some aspects of the disclosed concepts.

FIG. 6 is a dataflow diagram of an example feedback process 600 that enables an end user to provide feedback to an NLP system 601. The feedback enables the NLP system 601 to be fine-tuned over time and adapt to situations and messages that the system 601 was not directly programmed to handle, thereby increasing the flexibility of the system 601 to process natural language messages. In the example embodiment, the NLP system 601 is substantially similar to the NLP system 200 (shown in FIG. 2), and the system 601 includes an NLP database 603. In certain embodiments, the feedback process 600 includes additional, fewer, or alternative steps and/or data, including those described elsewhere herein.

In the example embodiment, the NLP system 601 is configured to establish a session associated with an end user in response to an initial user query associated with the end user. The session enables the NLP system 601 to track data associated the end user and maintain a historical record for the end user. As a result, historical user queries, language tokens, command triggers, commands, wagering game data, and/or NL responses associated with the end user may be used to analyze subsequent user queries and generate subsequent NL responses. For example, in response to a first NL response, the end user may provide subsequent NL input inquiring about the wagering game data of the NL response. The NLP system 601 may use the language tokens and command trigger associated with the first NL response that are stored as part of the session to formulate a new command trigger in response to the subsequent NL input. The NLP system 601 may generate and store a session identifier 602 associated with the session of the end user. The session identifier 602 is uniquely tied to the session such that the NLP system 601 incorporates the identifier 602 with data associated with the end user for tracking and identifying the data. The sessions may be maintained indefinitely or for a period of time. For example, if no NL input is received from the end user in a predetermined period of time, the session may be closed. Closing a session may cause the NLP system 601 to erase at least a portion of the data stored for the session to free storage resources for other sessions and/or other data.

In the example embodiment, in response to the NL response, the end user provides a feedback message 604 to the NLP system 601 via a user channel 609. The feedback message 604 indicates (i) whether or not the NL response (and the wagering game data) matches the end user's original request in the user query, or (ii) the comprehension of the natural language output of the NLP system 601, such as the NL response. The feedback message 604 may be a natural language message or a message formatted in a machine-readable structure. In some embodiments, the NLP system 601 causes the user channel 609 to prompt the end user for the feedback message 604. In other embodiments, the feedback message 604 is not prompted by the NLP system 601, and the NLP system 601 is configured to determine that the message 604 is feedback instead of a user query. The feedback message 604 may include positive feedback and/or negative feedback. That is, the feedback message 604 may indicate that the NLP system 601 correctly or incorrectly (i) understood the user query, (ii) retrieved the wagering game data, and/or (iii) provided an NL response in a comprehensible form. Positive feedback may be used to reinforce that the decisions made by the NLP system 601 are the proper decisions for the same or similar NL input from the end user. Negative feedback may be used to identify incorrect or outdated used by the NLP system 601 and to guide the NLP system 601 to make other decisions (e.g., generate an NL response using different terminology or remapping a command trigger to a different command) in subsequent natural language processing.

To incorporate the feedback for subsequent user queries, the NLP system 601 retrieves a corresponding NLP profile 611 from the NLP database 603. The NLP profile 611 is a set of data that facilitates the NLP system 601 to, among other things, transform NL input into language tokens, formulate command triggers, link command triggers to commands, and/or formulate the NL response based on the context of the NL input. In some embodiments, the NLP profile 611 is used as a knowledgebase or guide by the NLP system 601 to perform one or more of these actions. Accordingly, in the example embodiment, updating the NLP profile 611 based on the feedback message 604 may alter the subsequent decisions made by the NLP system 601.

In some embodiments, the NLP system 601 may respond to the end user providing the feedback message 604 to confirm the message 604 has been received, to clarify the feedback message 604, and/or to prompt the end user to provide additional feedback. In certain embodiments, an administrator associated with the NLP system 601 may review the feedback message 604 and cause the NLP system 601 to respond accordingly. The administrator may analyze the feedback prior to permitting the feedback from being incorporated into the NLP profile 611. At least partially automating the feedback process 600 facilitates dynamic and flexible operation of the NLP system 601.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A natural language processing (NLP) system for a wagering game environment, the NLP system comprising;
a first network interface communicatively coupled to a plurality of user channels configured to receive natural language (NL) input in a colloquial format from end users for requesting wagering game data;
a second network interface communicatively coupled to a plurality of wagering game channels, each wagering game channel associated with at least one type of wagering game data; and
logic circuitry communicatively coupled to the first network interface and the second network interface, the logic circuitry configured to:
 receive, via the first network interface, a user query including the NL input associated with an end user from a first user channel of the plurality of user channels;
 in response to the user query and determining the first user channel is associated with the user query, select a first NLP application from a plurality of NLP applications based on the first user channel, the first NLP application configured to process user queries from the first user channel;
 transform, using the first NLP application, the NL input of the user query into a plurality of language tokens;
 formulate a command trigger based on the plurality of language tokens;
 determine that the command trigger is linked to a command executable by a first wagering game channel of the plurality of wagering game channels by comparing the command trigger to a plurality of available commands of the plurality of wagering game channels;
 generate a command query incorporating the command, the command query structured in a predetermined format compatible with the first wagering game channel to execute the command;
 receive, from the first wagering game channel, a command reply including wagering game data associated with the command;

generate an NL response including the wagering game data; and transmit the NL response to the end user via the first network, interface.

2. The NLP system of claim 1, wherein the user query includes a user channel identifier associated with the first user channel, and wherein the first NLP application is retrieved in response to identifying the first user channel as the origin of the user query based on the user channel identifier.

3. The NLP system of claim 1, wherein the NL input is a text-based input or an audible input provided by the end user to the first user channel.

4. The NLP system of claim 1, wherein the command includes a command input to provide data associated with the NL input to the first wagering game channel, and wherein at least a portion of the command trigger is extracted to be incorporated in the command input.

5. The NLP system of claim 1, wherein the logic circuitry is further configured to establish a session associated with the end user in response to the user query, wherein a subsequent command query of the session is generated based at least partially on at least one of the original user query or the wagering game data associated with the original user query.

6. The NLP system of claim 1, wherein the command trigger is formulated using an NLP profile associated with the first NLP application that maps language tokens to command triggers based on historical command triggers, wherein the NLP profile is updated based at least partially upon the plurality of language tokens.

7. The NLP system of claim 1, wherein the NL response is generated based at least partially on historical NL responses stored by an NLP profile associated with the first NLP application.

8. A wagering game data system for providing wagering game data to end users, the wagering game data system comprising:
 a first wagering game channel configured to store at least one type of wagering game data, the first wagering game channel associated with a set of available commands;
 a natural language processing (NLP) system communicatively coupled to the first wagering game channel and a first user channel that receives natural language (NL) input from end users to request wagering game data, the NLP system comprising logic circuitry configured to:
 receive a user query requesting wagering game data from an end user via the first user channel, the user query comprising NL input including a plurality of phrases in a colloquial format from the end user;
 in response to the user query and determining the first user channel is associated with the user query, select a first NLP application from a plurality of NLP applications based on the first user channel, the first NLP application configured to process user queries of the first user channel;
 transform, using the first NLP application, the NL input of the user query into a plurality of language tokens;
 extract a command trigger from the plurality of language tokens;
 identify a command linked to the command trigger by comparing the command trigger to the set of available commands of the first wagering game channel;
 generate a command query incorporating the command, the command query structured in a predetermined format compatible with the first wagering game channel to execute the command;
 transmit the command query to the first wagering game channel, wherein the first wagering game channel is configured to execute the command of the command query;
 receive, from the first wagering game channel, a command reply including wagering game data associated with the command;
 generate, by the first NLP application, an NL response including the wagering game data; and
 transmit the NL response to the end user via the first user channel.

9. The wagering game data system of claim 8, wherein the NL input is a text-based input or audible input provided by the end user to the first user channel.

10. The wagering game data system of claim 8, wherein the logic circuitry is further configured to:
 transmit an authentication challenge to the end user in response to the user query;
 receive an authentication response including authentication data from the end user;
 in response to the end user being successfully authenticated based on the authentication data, transmit the NL response to the first user channel; and
 in response to the end user being unsuccessfully authenticated based on the authentication data, prevent the NL response from being generated.

11. The wagering game data system of claim 10, wherein the first wagering game channel is configured to request authentication from the end user via the NLP system in response to the command query.

12. The wagering game data system of claim 10, wherein each command of the set of available commands has a respective authentication requirement, and wherein the logic circuitry transmits the authentication challenge in response to the command linked to the command trigger having an authentication requirement indicating authentication is required.

13. The wagering game data system of claim 8, wherein the NL response is generated using an NLP profile associated with the first NLP application, the NLP profile configured to map colloquial formatting to the wagering game data based on historical NL responses to generate the NL response in a colloquial format.

14. The wagering game data system of claim 13, wherein the logic circuitry is further configured to receive a feedback message including NL input from the end user via the first user channel in response to the NL response, wherein the NLP profile is updated based on the feedback message.

15. A method for providing wagering game data from wagering game environments in response to natural language (NL) input from end users using a natural language processing (NLP) system, the method comprising:
 receiving, by logic circuitry of the NLP system, a user query associated with an end user requesting wagering game data from a first user channel of a plurality of user channels, the user query comprising NL input in a colloquial format;
 in response to user query and determining the first user channel is associated with the user query, selecting, by the logic circuitry, a first NLP application from a plurality of NLP applications based on the first user channel, the first NLP application configured to process user queries from the first user channel;

transforming, by the logic circuitry using the first NLP application, the NL input of the user query into a plurality of language tokens;

extracting, by the logic circuitry, a command trigger from the plurality of language tokens;

determining, by the logic circuitry, that the command trigger is linked to a command executable by a first wagering game channel of a plurality of wagering game channels by comparing the command trigger to a plurality of available commands executable by the plurality of wagering game channels;

generating, by the logic circuitry, a command query incorporating the command, the command query structured in a predetermined format compatible with the first wagering game channel to execute the command;

in response to transmitting the command query to the first wagering game channel, receiving, by the logic circuitry, a command reply including wagering game data associated with the command from the first wagering game channel;

generating, by the logic circuitry using the first NLP application, an NL response including the wagering game data; and transmitting, by the logic circuitry, the NL response to the end user via the first user channel.

16. The method of claim 15, wherein the NL input is a text-based input or an audible input provided by the end user to the first user channel.

17. The method of claim 15, wherein the command includes a command input to provide the first wagering game channel with data associated with the NL input, and wherein a language token of the plurality of language tokens is extracted to be included in the command input of the command.

18. The method of claim 15, wherein the command trigger is formulated using an NLP profile associated with the first NLP application that maps language tokens to command triggers based on historical command triggers, wherein the NLP profile is updated based at least partially upon the plurality of language tokens.

19. The method of claim 15 further comprising:

transmitting, by the logic circuitry, an authentication challenge to the end user in response to the user query;

receiving, by the logic circuitry, an authentication response including authentication data from the end user; and in response to the end user being unsuccessfully authenticated based on the authentication data, preventing, by the logic circuitry, the NL response from being generated.

20. The method of claim 15 further comprising:

identifying, by the logic circuitry, a second command trigger from the plurality of language tokens;

determining, by the logic circuitry, that the second command trigger is linked to a second command executable by a second wagering game channel of the plurality of wagering game channels;

transmitting, by the logic circuitry, a second command query incorporating the second command to the second wagering game channel;

receiving, by the logic circuitry, a second command reply including additional wagering game data associated with the second command from the second wagering game channel; and incorporating, by the logic circuitry, the additional wagering game data with the wagering game data from the first wagering game channel in the NL response.

* * * * *